United States Patent [19]
Armanios et al.

[11] Patent Number: 6,142,425
[45] Date of Patent: *Nov. 7, 2000

[54] APPARATUS AND METHOD FOR AERODYNAMIC BLOWING CONTROL USING SMART MATERIALS

[75] Inventors: Erian A. Armanios, Marietta; D. Stefan Dancila, Smyrna, both of Ga.

[73] Assignee: Georgia Institute of Technology, Atlanta, Ga.

[*] Notice: This patent is subject to a terminal disclaimer.

[21] Appl. No.: 09/131,464

[22] Filed: Aug. 10, 1998

Related U.S. Application Data

[63] Continuation-in-part of application No. 08/517,951, Aug. 22, 1995, Pat. No. 5,791,601.

[51] Int. Cl.$^7$ .................................................. B64C 21/04
[52] U.S. Cl. ........................... 244/207; 244/52; 239/590; 239/562
[58] Field of Search .............................. 244/207, 52, 213, 244/75 R, 7 R; 239/DIG. 9, 590, 562; 137/803; 60/527–529; 291/129.06, 129.17, 11; 410/20 R, 90 R, 24

[56] References Cited

U.S. PATENT DOCUMENTS

| | | | |
|---|---|---|---|
| 2,840,324 | 6/1958 | Smith | 244/52 |
| 3,005,496 | 10/1961 | Nichols | 244/207 |
| 3,472,470 | 10/1969 | Pauli | 244/76 R |
| 3,584,811 | 6/1971 | Leavy | 244/207 |
| 4,901,948 | 2/1990 | Panos | 244/52 |
| 5,127,228 | 7/1992 | Swenson | 60/528 |
| 5,626,312 | 5/1997 | Head | 244/75 R |

*Primary Examiner*—Galen L. Barefoot
*Attorney, Agent, or Firm*—Womble Carlyle Sandridge & Rice

[57] ABSTRACT

A method and apparatus for controlling the blowing of compressed air from an aerodynamic structure such as an aircraft wing or helicopter rotor blade and thus controlling the aerodynamic properties of the wing comprises a narrow slot (13) in the upper surface 915) of the structure near its trailing edge (14). Inside the wing (12) is a chamber (23) that is connected to the narrow slot (13) in the wing surface (15). The chamber (23) houses a compressed air conduit (16) for supplying and holding compressed air. A passageway (25) connects the conduit (16) to the slot (13) in the upper surface (25) of the wing (12). The lower wall (27) of the passage (25) has a slit (32) allowing a shutter (31) to move selectively into the passage (25) and obstruct the flow of compressed air through the passageway (25). The shutter (31) is attached to a smart material actuator comprising a piezoelectrical bender (29). When a control voltage is applied to the bender (29), the bender (29) will bend. The bending of the bender (29) causes the shutter (31) to move up into the passage (25) and obstruct the flow of compressed air. In this way, the flow of air out of the slot (13) in the wing surface (15) may be dynamically controlled by application of selective control voltages to the bender (29).

17 Claims, 5 Drawing Sheets

APPARATUS AND METHOD FOR AERODYNAMIC BLOWING CONTROL USING SMART MATERIALS

REFERENCE TO RELATED APPLICATION

This application is a continuation-in-part of U.S. patent application Ser. No. 08/517,951 filed Aug. 22, 1995, now U.S. Pat. No. 5,791,601.

TECHNICAL FIELD

The present invention relates generally to the modification and control of flow around a body immersed in a fluid through the use of fluid jet blowing from openings (orifices or slots) on the surface of the body and to the use of smart material for controlling the characteristics of the blowing.

BACKGROUND OF THE INVENTION

The flow field around lifting surfaces, such as aircraft wings and helicopter rotor blades, determines the pressure distribution over these surfaces and, therefore, determines the resulting aerodynamic forces and moments acting upon such surfaces. The modification and control of those forces can thus be achieved through modification and control of the flow field.

A number of methods of controlling the fluid flow around wings and rotors have been proposed and implemented. In the field of fixed wing aircraft, the most common method for controlling the flow around and consequently the forces generated by the wing is the use of a movable trailing edge surface, usually in the form of a flap. Basically, moving the trailing edge surface downward increases both the camber and the angle of attack of the wing thus modifying the flow field around the wing and causing the negative pressure distribution along the upper surface of the wing to increase in intensity. As a result, the lift force imparted to the aircraft is increased.

This solution, however, has a number of known disadvantages. Firstly, the trailing edge surface needs to be actuated, usually with a hydraulic actuator or actuators, which results in weight increase and added mechanical complexity. Secondly, when rapid movements of the trailing edge surface are required, limitations arise due to inertia and power/force limits of the actuating system. While not being particularly prohibitive in the case of fixed wing designs, these issues virtually eliminate the option of using flaps or other trailing edge surfaces on a moving wing such as the rotor blades of a helicopter. This is because such a rotor blade typically makes several rotations per second and a mechanically actuated flap system cannot respond rapidly enough.

Alternate methods for controlling the fluid flow around aerodynamic surfaces have been investigated. The blowing of fluid jets tangentially from one or more slots located on the surface of a wing to control the flow patterns about the wing has been established as a viable solution. The method is generally known as airfoil circulation control through blowing. Depending upon its characteristics, tangential blowing can be used to achieve two goals. The first goal is to energize the flow in the vicinity of the surface, known as the boundary layer and, therefore, delay the onset of flow separation and its adverse stalling effects. The second goal is an increase in the lift generated by the wing through an increase in the bound circulation of the airfoil. In this second case, blowing is performed over a trailing edge modified from a sharp point to a smoothly curved Coanda surface at the trailing edge. The blown jets and the adjacent flow will follow the Coanda surface until the balance between the pressure variation normal to the surface and the centrifugal force exerted on the jet is lost. The effect is to cause a change in the position of the stagnation points, a modification of the entire flow pattern, and a corresponding modification of the pressure distribution along the surface of the wing. The changes in pressure distribution and, consequently, the changes in aerodynamic forces and moments can be comparable to those created by a mechanical flap. Blowing thus has potential as an alternative to moving trailing edge surfaces such as flaps, particularly when the later solution is not practical, such as in controlling the lifting properties of helicopter rotor blades.

Both steady and unsteady blowing have been investigated, and certain benefits of unsteady blowing have been identified. The term "unsteady blowing" may include, for example, varying the flow rate of the blowing with time or, alternatively, changing the direction of or "vectoring" the blown jet as a function of time. A combination of variable flow rate and vectoring is also possible and useful. With regard to such unsteady blowing, one challenge for those skilled in the art has been developing effective methods of generating and controlling the characteristics of the blown jet rapidly enough to respond to real time flight correction or to control the lift characteristics of a helicopter rotor blade as it spins.

A recent attempt to control the blowing of compressed air from a wing is represented in the disclosure of U.S. Pat. No. 4,626,171 of Carter, Sr. et al. The method taught by Carter employs a chamber filled with pressurized air, which is ejected through a slot near the trailing edge of the wing. The air is expelled from the slot and travels along the wing surface and around the Coanda surface at the wings trailing edge. Thus, the flow pattern about the wing is modified as discussed above. To control the blowing, Carter discloses the use of large screws to adjust the maximum opening size of the blowing slot and thus control the rate at which compressed air is expelled from the slot. The pressure of compressed air inside the chamber controls the deflection of a portion of the slot opening thereby controlling the range of slot opening sizes up to the maximum set by the large screws. The pressure in the chamber directly controls the size of the slot opening. Thus, the rate at which the compressed air is expelled is increased by increasing pressure in the chamber and decreased by decreasing pressure in the chamber.

An initial difficulty with the system disclosed in the Carter patent is that the response time of the system is large. If one wishes to modify the normal flow about the wing, one must increase the rate at which compressed air is expelled from the slot by increasing the size of the slot opening. This in turn requires an increase in the pressure inside the chamber and substantial elapsed time for the pressure to build to a sufficient level to bend the portion of the wing forming the movable part of the blowing slot. The response time of a control input to decrease the slot size by decreasing the pressure in the chamber may be even longer. Reducing the slot opening size requires bleeding pressure from the chamber and this process can take up to several seconds to complete. Such slow response times and the inherent inaccuracies in measuring and regulating chamber pressure prohibit use of the system described in Carter for helicopter rotor blades or other applications requiring rapid cyclical blowing to modify airflow patterns at rapid rates.

Other attempts to control blowing from aircraft wings to control lift have lead to mechanical control systems. U.S.

Pat. No. 4,966,526 of Amellio, et al. Discloses such a mechanical system for controlling the slot size and thus the rate of blowing from the slot. The Amellio patent illustrates several embodiments using a camming system to alter the size of the slot opening mechanically. This mechanical system, however, is bulky and as such can not be used in many applications. Additionally, the weight penalties for this system are substantial. Just as with most mechanical systems, maintenance and installment costs are also typically quite high. Finally, response time is not dramatically improved over the Carter patent discussed earlier. Not only would such response times be prohibitively slow for use of this system with a helicopter rotor blade, the extreme mechanical complexity required at the rotor hub to cycle the control system at rotor rates would be prohibitive.

In addition to all the inadequacies with the prior art discussed above, there are other more general shortcomings of the various systems for controlling blowing disclosed in the prior art. Most such systems depend on a thin spanwise slot, i.e. a slot that extends substantially the entire length of the wing, to deliver the air stream out of the wing surface. As such, there is no effective means for controlling the airflow independently at different points along the slot or along the wing. In other words, the air flow out of the slot cannot be varied as a function of position along with wing span. Any attempt to do so would greatly increase the mechanical complexity of the system.

Since mechanical flaps are not practical for rotor blades, helicopters and other rotorcraft historically have used a swashplate system located at the rotor hub. Through such a system, the rotor blades of the helicopter are cyclically pitched as they travel around the rotor hub. The result is a changing of each rotor blade's relative angle of attack as a function of its rotary position. This, in turn, changes the airflow and lift characteristics of the blades as they travel around the rotor hub. While swashplate systems have been successful and are used in virtually all commercial and military helicopter designs, they are nevertheless plagued with inherent problems primarily because the mechanical complexity of a swashplate system renders it difficult and expensive to maintain. In addition, the high cycle rates required induces substantial mechanical vibration and noise in the aircraft and stresses the mechanical components of the entire drive system.

Thus, there exists a specific need for a method and apparatus for controlling the blowing of air over lifting surfaces that overcomes the problems of the prior art by providing a system with reduced mechanical complexity, high reliability, and fast response time. Further, while rapid, light weight, mechanically simplified, and highly reliable blowing control is particularly useful for use in aircraft lift surfaces, such control has many applications outside the aircraft industry. For example, a vectored blowing system might be useful in submarines or spray painting devices. Creation of efficient clean burning gas flames with controllable directivity might also be a beneficial use of such a system. Thus, a general need exists for a light weight blowing control system, and particularly a vectored blowing control system, for use in a variety of applications. It is to the provision of such a method, apparatus, and system that the present invention is primarily directed.

SUMMARY OF THE INVENTION

It is an object of the present invention to overcome the deficiencies and inadequacies of the prior art as noted above and as generally known in the art.

Another object of the invention is to provide a method of controlling the blowing from an aircraft wing or helicopter rotor blade that embodies a minimum of mechanical complexity.

A further object of the invention is to provide a mechanism for controlling aerodynamic blowing that can respond to control inputs fast enough to be used in conjunction with helicopter rotor blades.

Another object of the invention is to provide a mechanism for controlling blowing that can be used to generate unsteady blowing while using a plenum with a substantially constant pressure as the source of the blowing jet.

A still further object of the invention is to provide a mechanism for controlling blowing wherein the blowing may be independently controlled at different spanwise positions along a wing or rotor.

It is also an object of the invention to provide a lightweight, effective, and rapidly cyclable vectored jet blowing system for use in aircraft and for other more general applications as well.

These and other objects are realized through the present invention, which, briefly described, comprises a method and apparatus for controlling the blowing of compressed air generally and, in the preferred embodiments, from an aerodynamic surface such as a wing or helicopter rotor blade to achieve modification of the aerodynamic characteristics thereof. The method, in one embodiment, comprises providing a source of compressed air that communicates with one or more slots or other outlets at a selected location on the blade so that air can be blown from the slots or outlets. The characteristics of the blowing, including activation and deactivation, the magnitude, and the direction of the blown jet are controlled by a valving and/or nozzle mechanism adapted to interrupt or otherwise affect the compressed air stream provided to the slot. The valve or nozzle, in turn, is activated and controlled through the use of a smart material actuator such as, for example, a piezoelectric bender.

In the disclosure and description provided herein, the term "smart material" is used for any substance in a solid state that exhibits a coupled mechanical-nonmechanical behavior that can be used to generate a straining of the substance by means other than mechanical loading. A list of smart materials includes, but is not limited to piezoelectric materials, elecrostrictive materials, magnetostrictive materials, and shape memory alloys. Shape memory alloys are defined as materials that strain when a microstructural phase change and consequent shape deformation is produced through a temperature change. These materials generally may exhibit a large deformation, but have large time constants. Magnetostrictive materials, on the other hand, are defined as materials that strain or deform when a magnetic field is applied. The presence of strong magnetic fields may not be desirable in certain applications, but may be acceptable in other applications. Electrostrictive materials deform under the influence of an electric field and piezoelectric materials deform when a control voltage is applied.

The term "smart material actuator" is used herein to refer to any device that consists of, or contains, or makes use of a smart material, or a combination of smart materials, or a combination of smart materials and conventional materials to achieve a controlled change in dimensions and/or shape of the actuator under the effect of one or more controlled nonmechanical inputs to the device. Examples of nonmechanical inputs include, but are not limited to, electric fields or control voltages, magnetic fields, and temperature fields.

In the preferred embodiment of the present invention, which represents the best mode known to the inventors of carrying out the invention, the valving and vectoring mechanisms that control the characteristics of a blown jet are coupled to a piezoelectric bending actuator (piezoelectric bender). Upon application of a control voltage, the bender flexes to manipulate the mechanics and, in turn, to control the rate of discharge and/or direction of compressed air supplied from a plenum. The advantage of a piezoelectric material actuator for this purpose is that it has a very short response time relative to other smart material actuators. Thus, the blowing can be controlled precisely and rapidly. This makes the present invention particularly suited to use in conjunction with helicopter rotor blades, where rapid cycled modification of lift characteristics is required.

The control mechanism of this invention is compact, requires only a small number of moving parts, and is simple in construction and reliable in operation. Thus, the entire control mechanism can easily be housed within a helicopter rotor blade, aircraft wing, or other aerodynamic structure. Further, a succession of controllers of this invention can, if desired, be located along a rotor blade or wing so that blowing can be controlled independently at various spanwise positions. Such variable control is not practically possible with mechanical or other prior art blowing control schemes.

Thus, an improved method and apparatus for controlling the blowing from a wing or rotor blade to modify its aerodynamic characteristics is now provided. The method and apparatus addresses and solves the problems of the prior art by eliminating the need for complex mechanical control mechanisms. The use of piezoelectric material actuators to control the valving and vectoring mechanisms provides for rapid and reliable blowing control. This is a vast improvement over plenum pressure control schemes. Finally, control of the piezoelectric actuator through the application of control voltages renders the present system uniquely compatible with a fly-by-wire aircraft design. The blowing control can be integrated quite easily into a system in which the blowing is continuously monitored and controlled to produce optimum lift characteristics and fast response to changing conditions, such as changing winds, air pressure, or temperature. Real time adjustment for the different relative wind speeds of a helicopter rotor blade on the windward and wayward sides of its travel are also a prime application.

These and other objects, features, and advantages of this invention will become more apparent upon review of the detailed description set forth below taken in conjunction with the annexed drawing figures, which are briefly described as follows.

DETAILED DESCRIPTION OF THE INVENTION

Figure 1:
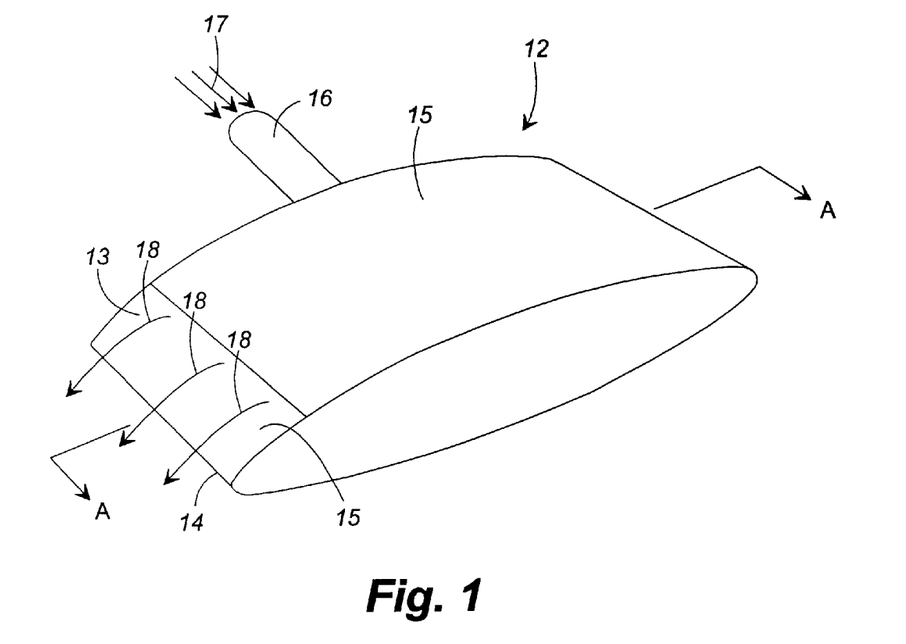
FIG. 1 is a perspective illustration of a section of a section of a rotor blade or wing that embodies principles of the present invention in a preferred form.
Figure 2:
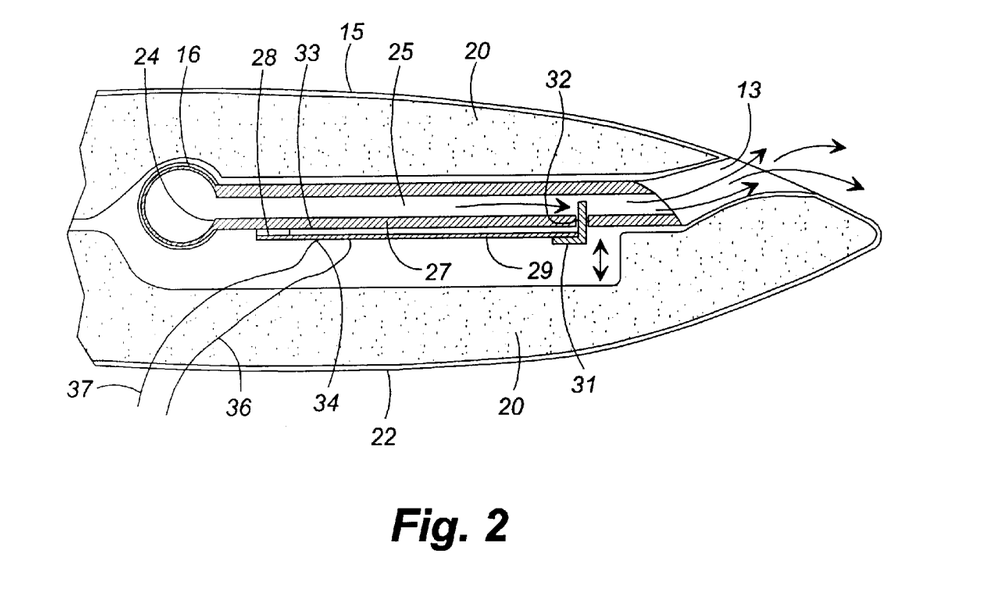
FIG. 2 is a sectional view taken along A—A of FIG. 1 illustrating one preferred smart material actuator based control mechanism for implementing the method of the present invention.

Referring now to the drawing figures, in which like reference numerals designate like parts throughout the several views, FIGS. 1 and 2 illustrate one preferred apparatus and method for implementing the present invention. It should be noted that the embodiments illustrated and described herein make use of this invention as applied to a helicopter rotor blade. Further, the detailed description of the illustrated embodiment will also be presented in the context of a helicopter rotor blade. However, even though the invention is particularly suited to use with helicopter rotors, the scope of the invention is far from limited to such applications. It is equally applicable, for example, to the wings and control surfaces of fixed wing aircraft, to controlled blowing from fuselage sections of the aircraft and, indeed, to controlled fluid blowing from the control surfaces of submarines. It even has application in steering jets of air from nozzles and in vectoring the blowing of air from wings and rotors to form fluid flaps. Steering control for rockets and missiles is also an application as well as blowing control in general industrial applications such as spray painting and gas burners. Thus, it will be understood that the illustrated preferred embodiment is presented and discussed herein for ease and clarity of explanation, but that the invention is not limited in scope to the illustrated embodiment.

One further point to be made is that the descriptions of the preferred embodiments that follow represents an accurate description of a proof-of-concept device, built within technological and financial constrains. As such, some of the features and design elements, although preferred and representative of the best mode presently known to the inventors, reflect the choices of material and processing techniques available at the stage of proof-of-concept. A commercial production system obviously would include additional elements required by mechanical constrains of an operating aircraft, however the basic principles disclosed and claimed herein would be embodied in a commercial system.

FIG. 1 illustrates a short section of a helicopter rotor blade 12. It will be understood that the complete rotor blade is much longer than the illustrated section and normally extends from the hub of the helicopter to a distal end. The illustrated section is presented for clarity of presentation. A narrow slot 13 extends spanwise on the upper surface near the trailing edge portion of the blade. If the entire rotor blade were depicted, the slot 13 preferably would run spanwise for substantially the entire length of the rotor blade. As one skilled in the art will recognize, the length of the slot may be varied in accordance with the demands of a specific application. Furthermore, one skilled in the art will recognize that an elongated slot is not the only aperture configuration possible for use with the embodiments of FIGS. 1 and 2. For example, a plurality of small holes or a series of short slots could be used effectively. For this reason, the present invention is not intended to be, nor should it be, limited to only the use of a single, long slot in the surface of the blade.

While not critical to the invention disclosed, the narrow slot 13 is located in the upper surface 15 of the rotor blade section less than one-half chord distance from trailing edge 14. The location of the slot 13 along the surface of the rotor blade section 12 could dramatically affect the flow around the blade and thus its lift characteristics. The present invention is not intended to be limited only to the preferred embodiment and a blow slot at virtually any location on the rotor blade surface is possible and falls within the scope of the invention.

The trailing edge portion 14 of the rotor blade section 12 is formed into a smoothly curved Coanda surface. A compressed air supply conduit 16 extends within and along the length of the blade and forms a plenum that supplies pressurized air, depicted by arrows 17, to the interior of the rotor blade section 12. While pressurized air is used for the blowing fluid in the preferred embodiment to match the ambient air in which the rotor blade functions, other blowing media such as inert gas or even liquid mists are possible. However, air is preferable because of its availability and ease of distribution.

The pressurized air 17 is provided to the conduit 16 from an appropriate source, such as a compressor. This is, however, not the only possible source of compressed fluid and the present invention is in no way limited to any specific source of compressed fluid. For example, a compressed fluid caption located at the tip of the rotor blade could feed the plenum at a pressure equal to the blade tip free-stream total pressure, with the benefit of mechanical simplification. This compressed air is fed in the plenum tube 16 until ejected, by application of this invention, through the narrow slot 13, as depicted by arrows 18. Pressurized air emitted or blown from the slot 13 passes along the rear portion of the upper surface 15 to the trailing edge 14 thereof. At the trailing edge, the air stream follows the trailing edge 14 Coanda surface until centrifugal force causes separation of the stream from the skin of the rotor blade section 12. As discussed above, this has the effect of shifting the stagnation points on the blade and modifying the air flow patterns about the blade to control its aerodynamic characteristics.

The present invention includes a method and device for controlling the blowing from the slot 13 using a smart material actuator. FIG. 2 shows a side sectional view of the rotor blade section of FIG. 1 taken along the sectional arrow AA thereof and illustrates a preferred embodiment of the present invention. The rotor blade 12 is formed with an upper surface 15 and a lower surface 22. The upper and lower rotor blade surfaces define the aerodynamic shape of the rotor blade and also form an interior cavity 23. The upper surface is interrupted at the rear end portion of the blade to define a spanwise slot 13 therein. More specifically, the upper surface terminates just short of the trailing edge of the blade. The lower surface 22 wraps around the trailing edge of the blade to form a smooth Coanda surface 14 and then extends beneath the terminated edge of the upper surface if 15. This configuration forms the spanwise slot 13 as shown in FIG. 2. Preferably, the interior cavity of the blade is at least partially filled with a light strong material 20 that strengthens the blade and further defines the contour of the slot 13; however, such a filler is not a requirement.

Housed in the blade cavity 23 is the compressed air supply conduit 16, which functions as a plenum for the compressed air. The conduit 16 is formed from an elongated cylindrical tube, although any suitable shape may function equally well in the present invention. An aperture in the form of a longitudinally extending slot 24 is formed in the tube 16 such that the pressurized air 17 held in the tube 16 may pass through the slot 24. The slot 24 preferably extends substantially for the entire length of the conduit 16; however, shorter slots or individual spaced slots are possible.

Attached and sealed with a suitable adhesive to the conduit 16 at a location directly above the slot 24 is an upper plate 26. The upper plate 26 preferably is fashioned from a thin, rigid, light-weight material such as Plexiglas or aluminum. In the preferred embodiment, the upper plate 26 is rectangular with a length substantially corresponding to the span of the rotor blade or of an individually controllable blowing slot therealong. However, in other embodiments, the length of the upper plate 26 may be modified as desired to suit a particular purpose. The upper plate 26 extends from the conduit 16 to the vicinity of the spanwise slot 13.

Attached with a suitable adhesive to the conduit 16 directly below the slot 24 and spaced from the upper plate 26 is a lower plate 27. Just as with the upper plate 26, the lower plate 27 preferably is formed of a rigid, light-weight material and fashioned into a thin, rectangular shape with a length substantially corresponding to that of the upper plate 26. The lower plate 27 also extends from the conduit 16 to the vicinity of the spanwise slot 13.

The upper and lower plates 26 and 27 are positioned in spaced parallel relationship with respect to each other to form a narrow passageway 25 that communicates between the slot 24 in the conduit 16 and the spanwise slot 13 in the surface of the rotor blade. Thus, pressurized air can be delivered from the conduit 16 to the slot 13 through the passageway 25 for ejection or blowing of the compressed air through the slot 13. A series of spaced apart partitions can be located along the passageway 25. These partitions extend transversely relative to the rotor blade and divide the passageway 25 into discrete sections spaced along the blade. Each of these discrete sections can then be independently controlled according to the present invention to tailor the blowing of air from the slot 13 as a function of position along the blade and thus to modify air flow around the blade to control its lifting properties.

The illustrated embodiment shows use of the present invention in conjunction with a single such section of the passageway 25. It will be understood, however, that this arrangement in a typical application likely will be repeated along the length of the blade with possibly numerous adjacent ones of the discrete sections of the passageway 25. The number of discrete sections provided along the length of a rotor blade is discretionary with one skilled in the art and depends upon the design goals and purposes of the blade. In fact, a single passageway extending along the length of a blade could be appropriate in certain applications. The invention is not limited to any one size or number of discrete controllable passageway sections.

A narrow slit 32 is fashioned in the lower plate 27. This slit 32 spans one of the discrete sections of the passageway. The spacing of the slit 32 from the conduit 16 is not critical to the invention. However, in the preferred embodiment, the slit 32 is positioned some relatively small distance from the end of the lower plate 27 and adjacent to the blowing slot 13.

Securely attached by a suitable adhesive or attachment means to the underside of the lower plate 27 adjacent to the conduit 16 is a spacer block 28. The spacer block 28 can be a thin rectangular member with a length approximately equal to the width of the discrete section. Alternatively, the spacer block 28 could just as effectively be fashioned to be a rectangular member spanning the length of the entire rotor blade. On the lower side of the spacer block 28 is attached one end of a piezoelectric bender 29 in the form of a rectangular leaf. In the present embodiment, the bender 29 has a width corresponding to the width of the slit 32 in the same lower plate 27 to which the spacer block 28 and bender 29 is attached. This is, however, not a requirement and any width or size or shape of actuator is within the scope of the present invention. Further two or more side-by-side benders might well be used in place of a single bender. The length of the bender 29 is approximately a length adequate to span the distance from the spacer block 28 to the slit 32 in the lower plate 27.

A rigid L-shaped shutter member 31 is fixed by one of its legs to the free end of the piezoelectric bender 29. The other leg of the shutter member 31 protrudes through the slit 32 in the lower plate 27 and into the passageway 25. The length of the shutter member 31 corresponds to the length of the slit 32 through which it passes. The length of the second leg of the shutter member is sufficient to span the space between the upper and lower plates 26 and 27 when the shutter member moves through the slit 32. In this way, communication through the passageway can be selectively closed off or opened up by moving the shutter member into and out of the slit 32 respectively. In addition, communication through the passageway can be only partially restricted, if desired, by moving the shutter member part way through the slit 32.

Attached and electrically connected to the leaf 29 are an upper electrode 33 and lower electrode 34. These electrodes are connected by an upper electrode wire 36 and a lower electrode wire 37 respectively to a controllable voltage source (not shown in FIG. 2). The piezoelectric bender 29 is selected so that it exhibits a bending behavior when actuated by a control voltage. That is, when a control voltage is applied across the electrodes, the bender 29 bends so that its free end moves upwardly with a frequency, amplitude, and modulation pattern corresponding to that of the control voltage. When the control voltage is removed, the bender 29 returns to its original flat configuration. The effect is to move the distal end of the bender up and down as indicated by arrows 30 in FIG. 2.

As the bender 29 bends upward, the second leg of the shutter member 31 moves through the slit 32 and into the passageway 25 formed by the upper plate 26 and the lower plate 27. As the leg of the shutter member moves into the passageway 25, communication through the passageway becomes restricted. When the leg moves completely into the passageway, so that it comes into or near to contact with the upper plate 26, communication through the passageway 25 is substantially closed off. Conversely, when the leg of the shutter member 31 moves out of the passageway 25, communication through the passageway is opened. Thus the shutter member 31, which, in turn, is controlled by the piezoelectric bender 29, effectively controls the flow of compressed air from the conduit 16, through the passageway 25, and out of the slot 13. In practice, it has been found that as the bender is actuated by a time varying control voltage, the blowing of compressed air from the slot 13 is modulated about a mean. Since the bender 29 is capable of responding rapidly to the control voltage, modulation frequencies of 20 to 60 hertz and higher are achievable. Thus, unlike mechanical or pressure controlled systems, the present invention is well suited to use with helicopter rotors, which typically spin at a rate of from 2 to 10 rotations per second.

Thus, it will be seen that the present invention in the embodiment of FIGS. 1 and 2 provides a means for controlling the blowing of compressed air from a slot in a helicopter rotor blade to control the aerodynamic properties of the blade. The method and control device of the embodiment employs a shutter that can be selectively inserted into the air passageway through which compressed air is delivered from a supply conduit to a blowing slot in the blade. Thus, the shutter acts as a valve that can substantially shut off air flow through the slot 13, open up air flow, or, when inserted only part way into the passageway, limit or restrict the flow. Modulation of blowing about a mean is also a feature. The valve is coupled to a piezoelectric bender that, when excited by application of a control voltage, bends to move the shutter into and out of the passageway. Because the piezoelectric bender responds fast to the application or removal of control voltage, the stream of compressed air from the slot in the blade can be modulated rapidly through application of a modulated control signal. Accordingly, the present invention is uniquely suited for use in a helicopter rotor blade as an alternative to the traditional swashplate, which rapidly but mechanically varies the angle of attack of the blades. Replacement of the swashplate mechanism with blowing control as embodied in the present invention significantly reduces the weight, complexity, and maintenance requirements inherent in mechanical systems such as swashplates. In addition, there is no swashplate system able to vary the angle of attack of a blade selectively both as a function of time and as a function of location along the rotor blade. The present invention easily accomplishes this function when a plurality of independently controllable valve mechanisms of this invention are spaced along the length of the blade.

In another possible embodiment, the piezoelectrically actuated shutter valve is removed and a piezoelectrically actuated member substituted as one of the wells of the passageway. In such a configuration, the piezoelectrically actuated wall is displaced into the passageway when a control voltage is applied to restrict the cross-sectional area of the passageway. Thus, the compressed air flow through the passageway is restricted or eliminated by actuation of the smart material passageway wall.

All these configurations overcome a common difficulty with proposed smart material actuators used to achieve flow field modification by directly and mechanically changing the exterior shape of the wing structure to which the said actuators are attached or within which the said actuators are embedded. When using smart material activators for such direct mechanical control, piezoelectric materials are fast to respond, but exhibit very small maximum straining or movement under the effect of the input voltage. Shape memory alloys exhibit larger strains, but are slow to respond due to inherent long time constants associated with heat transfer processes needed for temperature changes. As a consequence, attempts to use smart material actuators to obtain actual and rapid structural deformations significantly equivalent to movable trailing edge surfaces have not produced practical results.

The present invention capitalizes on the idea that the small displacement characteristics for smart material actuators are on the same order of magnitude as the passageway sizes used for blowing, while the forces needed in the process of partially or completely obstructing the blowing flow can be small enough to be overcome by such actuators, as illustrated by the preferred embodiment of the present invention. Therefore, in addition to the preferred embodiment of the invention disclosed in FIGS. 1 and 2, the use of any smart material actuators, as defined herein, in any configuration or combination to achieve the effect of modulating the blowing flow in intensity or direction (vectoring of the blowing jet) falls within the scope of the invention.

Figure 4:
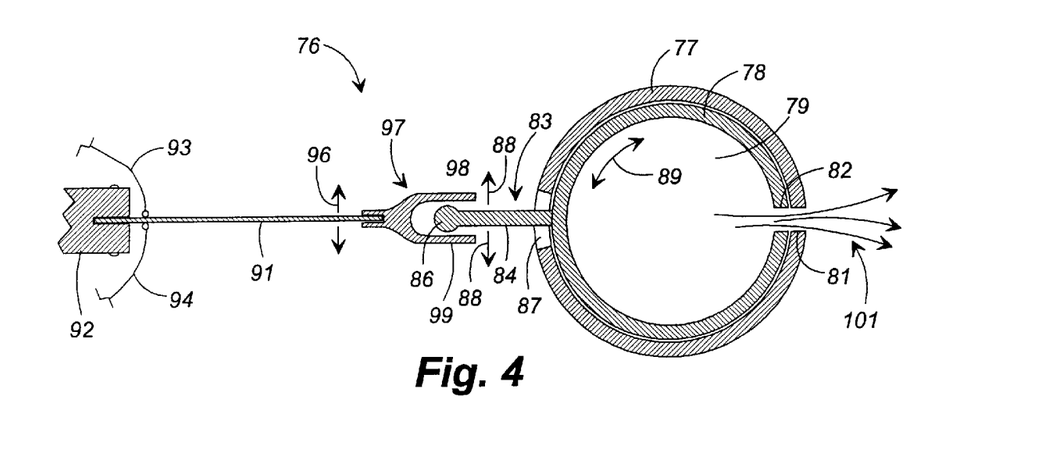
FIG. 4 is a cross-sectional view of a vectored jet control mechanism that embodies principles of the invention in a preferred form.
Figure 5:
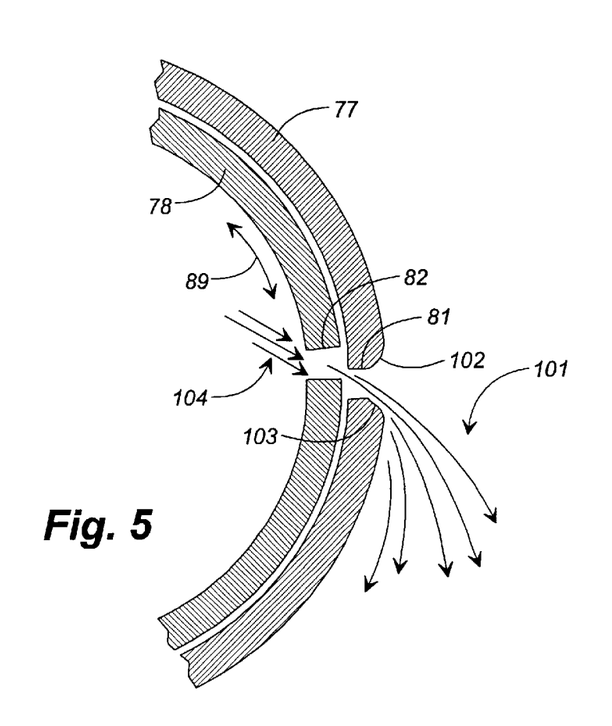
FIG. 5 is an enlarged cross sectional view of the embodiment of FIG. 4 illustrating enhanced vectoring through use of a Coanda surface at the flow exit.

As an example of an embodiment for vectoring a blowing jet, a cylindrical plenum having a longitudinal slot is telescopically received in an outer cylindrical baffle with a corresponding slot as illustrated in FIGS. 4 and 5 and as described in more detail below. A piezoelectric bender is operatively coupled to rotate the outer baffle or the cylindrical plenum slightly to align or misalign the slots, thus opening up and shutting off the air stream, respectively. With such an embodiment, partial movement of the bender functions to modulate the intensity of the blowing and, at the same time, vector, or change the direction of, the compressed air jet or sheet issuing from the slot. Again, the outer edge of the blowing slot and the surface of the outer cylinder functions as a Coanda surface and is essential in significantly changing the direction of the jet. Large angles of jet deflection can thus be achieved in response to small relative rotations of the concentric cylinders, compatible with smart material actuator outputs and using small forces that can be generated by the said actuators. The vectored jet of air may be ejected from the trailing edge of a wing or blade, forming what is known in the art as a fluid flap, and ultimately influencing the characteristics of the flow field around the wing or rotor blade.

The advantage of smart material actuators and particularly piezoelectric material actuators over mechanical systems is reduced weight, reduced complexity, and increased efficiency and reliability. In addition, use of the present invention in a helicopter rotor blade provides the possibility of control cycles beyond rates otherwise achievable. The present invention has the potential to be used in noise and vibration level reduction applications, where the required fast and distributed variation of the flow characteristics could not be achieved by the use of current art. Additionally, the important decline in mechanical complexity of the rotor system could render helicopters much more cost-effective to operate and maintain. As mentioned above, blowing control as a function of position along the blade is made relatively simple by the control system of this invention, whereas such control is simply not possible with prior art mechanical control schemes.

In certain other applications of the present invention, it may be desirable to employ a smart material actuator to control the fine relative movement of a device manufactured as a sieve-like screen superimposed on another sieve-like screen. These two screens could be used such that output of the smart material actuator would cause one screen to shift relative to the other. In essence, a variable-porosity wall would be used to modify if and/or control the air flow associated with blowing or suction through an aerodynamic surface.

It should also be observed that piezoelectric materials are not the only type of smart material that could be used in the present invention. Other smart materials, as defined herein, could be used advantageously in certain other embodiments. Therefore, the present invention is not intended to be, nor should it be, limited to any particular smart material, even though a piezoelectric actuator has been illustrated in the preferred embodiment and is presently the best mode known to the inventors.

Figures 3A, 3B, 3C:
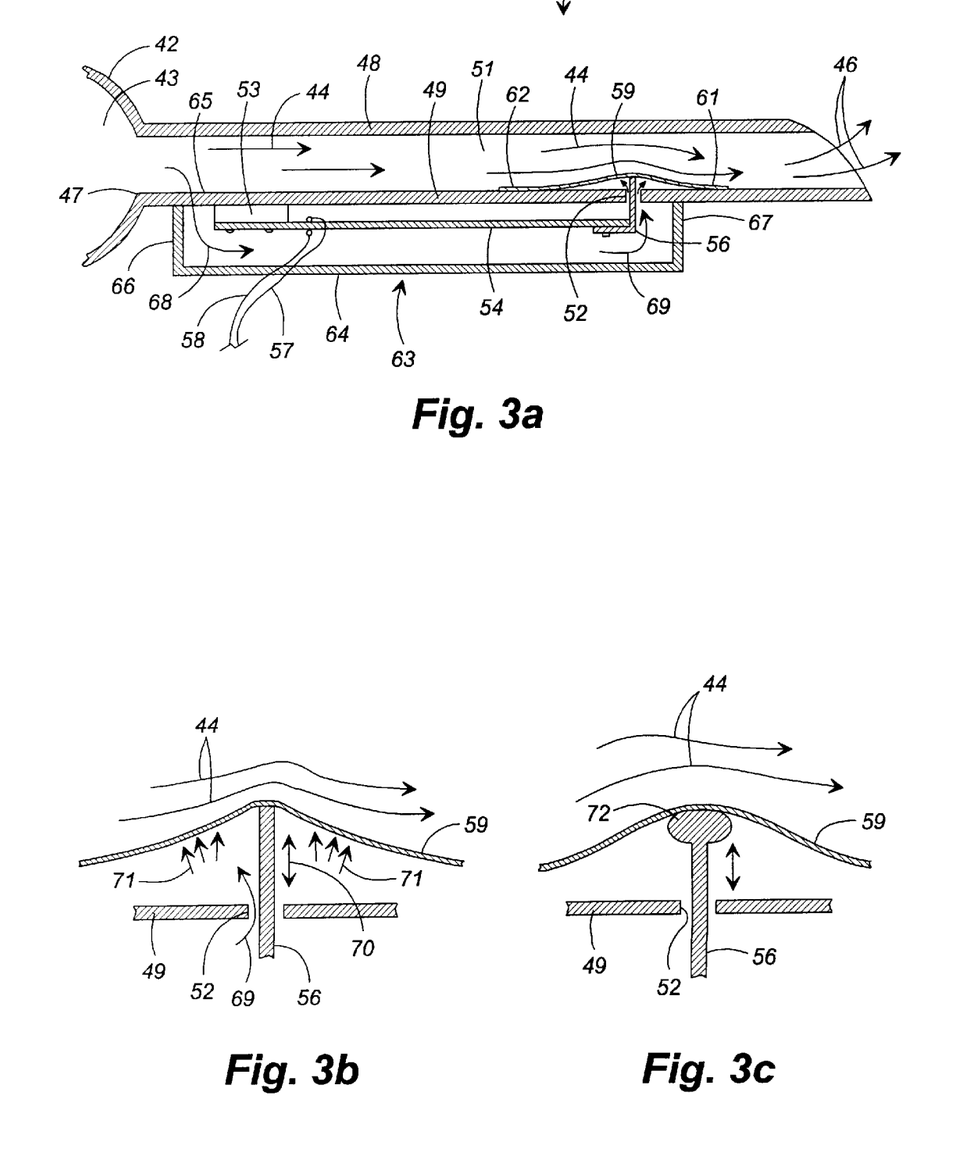
FIGS. 3A, 3B, and 3C illustrate the present invention in another embodiment producing reduced turbulence and thus reduced losses within the passageway.

FIGS. 3A, 3B and 3C illustrate an enhanced configuration of the embodiment of FIGS. 1 and 2. The blowing control apparatus 41 shown in these Figures is similar in many respects to that shown in FIGS. 1 and 2. Specifically, the apparatus 41 includes a compressed air conduit 42 forming a plenum 43 having a length-wise slot 47 formed therein. An upper plate 48 and a lower plate 49 extend from the slot 47 and are spaced apart to define a passageway 51. A spacer block 53 is fixed to the bottom plate 49 and anchors the front end portion of a piezoelectric bender 54. An L-shaped shutter member 56 is attached to the rear end portion of the bender 54 and has a leg that is moved into and out of the passageway 51 as the bender 54 is actuated and deactuated.

In the embodiment of FIGS. 1 and 2, it has been found that movement of the shutter into the passageway can in some circumstances create turbulence in the flow through the passageway thereby reducing the energy of the flow and the efficiency of the blowing. To avoid the creation of such disturbance, the embodiment of FIGS. 3A through 3C includes a flexible membrane 59 covering the narrow slit 52 and the shutter 56. The membrane 59 has a forward edge portion 62 that is sealingly attached to the floor of the inner wall of the lower plate 49 on one side of the slit 52. Similarly, the membrane 59 has a rear edge portion 61 that is sealingly attached to the floor of the lower plate 49 on the other side of the slit 52. With the membrane 59 in place as described, movement of the shutter 56 into the passageway 51 pushes the membrane 59 upwardly as illustrated in FIG. 3A. The membrane 59 then assumes a smoothly contoured shape from its forward edge portion 62 across the top of the shutter 56 to its rear edge portion 61. As a result, the flow through the passageway 51, indicated by arrows 44, remains substantially laminar as it traverses the membrane 59 to exit as an ejected jet 46. Nevertheless, blowing control is still maintained because the area of the passageway is reduced by movement of the shutter 56 into the passageway. Since turbulence is reduced significantly, the energy of the ejected jet 46 is maximized.

Referring still to FIG. 3A, it has been found out under certain conditions, the air flow 44 through the passageway exerts sufficient pressure on the membrane 59 to counteract the force of the piezoelectric bender 54. When this happens, the bender may not be able to insert the shutter member 56 fully into the passageway and a degree of control can be lost. In order to address this phenomenon, an equalizing pressure chamber 63 is disposed on the lower plate 49 enclosing the actuator assembly. In the illustrated embodiment, the equalizing pressure chamber 63 is formed from a bottom wall 64, a forward wall 66, and a rear wall 67 and is secured to the lower plate 49 such that a closed sealed enclosure is formed around the actuator assembly.

An opening 65 is formed in the lower plate 49 inside the chamber 63. During operation, the air pressure within the chamber 63 is equalized with the pressure within the passageway 51 by pressurized air 68 flowing through the opening 65. Thus, the pressure within the chamber 63 is substantially the same as the pressure within the passageway 51. Since there is some tolerance between the shutter member 56 and the narrow slit 52 through which it extends, air within the chamber 63 flows through the narrow slit 52 as indicated at 69 and into the sealed region beneath the membrane 59. Thus, the air pressure beneath the membrane 59 is maintained at substantially the same level as the air pressure within the passageway 51. As a result, the force exerted by the flow on the top of the membrane 59 is counteracted by the pressure beneath the membrane. Accordingly, the piezoelectric bender 54 does not have to overcome this force and can insert the shutter 56 and its associated membrane fully into the passageway 51 upon application of a control voltage.

FIGS. 3B and 3C illustrate alternate configurations of the shutter/membrane combination. In FIG. 3B, the top edge of the shutter is square and relatively sharp, resulting in a peak at the center of the membrane 59. Air pressure 71 is shown acting on the bottom of the membrane to counteract the forces exerted on the top of the membrane by the flow 44. The shutter 56 is thus able to move freely up and down within the passageway as indicated at 70.

FIG. 3C illustrates a shutter 56 having a rounded or bulbous top end 72. This configuration produces a smoother transition across the peak of the membrane 59, further reducing the likelihood of turbulence being formed within the passageway. It will be apparent to those of skill in the art that a variety of other shapes might be used to achieve a particular membrane shape as the shutter moves in and out of the passageway. In addition, the resiliency of the membrane 59 itself could be selected and/or combined with shutter configurations to achieve a desired membrane contour.

FIGS. 4 and 5 illustrate an alternate embodiment of the present invention adapted to generate a vectored jet or sheet of compressed air. As discussed briefly above, such vectored jets can be used efficiently as fluid flaps along the trailing edge of a wing or rotor to change the lift characteristics thereof. The vectored jet controller 76 in FIG. 4 comprises an elongated outer cylinder 77 and an inner cylinder 78 that is disposed within the outer cylinder coaxial therewith and defining a plenum 79. The be tolerance between the outer and inner cylinders 77 and 78 is such that the inner cylinder is held firmly within the outer cylinder but nevertheless is freely rotatable in the direction indicated at 89 within the outer cylinder.

The outer cylinder 77 is formed with an axially extending slot 81 along one side. The inner cylinder 78 is formed with a similar axially extending slot 82 that is substantially radially aligned with the slot 81 and the outer cylinder 77. It will be appreciated that, with this configuration, as the inner cylinder is rotated about its axis in directions 89, the slots 81 and 82 are correspondingly aligned and misaligned with each other. As described in more detail below, when the plenum 79 formed by the inner cylinder 78 is provided with compressed air, this alignment and misalignment of the slots 81 and 82 produces a relatively flat jet sheet 101 with the direction of the jet being dependent upon the degree of alignment or misalignment of the slots 81 and 82. Alternatively, the inner cylinder 78 can be rotated until the slots 81 and 82 are completely misaligned with each other, completely shutting off the jet 101.

A control lever 83 is fixed to the inner cylinder 78 opposite the slot 82 and extends therefrom through a slit 87 in the outer cylinder 77. The control lever 83 comprises an arm 84 that terminates at its free end in a rounded tip 86. It will thus be seen that movement of the control lever 83 in the directions indicated by arrows 88 causes the inner cylinder 78 to rotate with respect to the outer cylinder 77 in the direction of arrows 89. Thus, movement of the control lever 83 causes the slots 81 and 82 to be aligned and misaligned according to the degree and direction of movement of the control lever 83.

A piezoelectric bender 91, similar to that illustrated in FIGS. 1 through 3, is fixed at one end to an anchor 92 and extends therefrom toward the rounded tip 86 of the control lever 83. Control voltage electrodes 93 and 94 are electrically coupled to the bender 91. Application of selected control voltages through the electrodes 93 and 94 causes the bender 91 to move up and down in the direction of arrows 96, depending on the polarity and magnitude of the applied control voltage. A fork 97 is fixed to the free end of the bender 91. The fork has an upper finger 98 and a lower finger 99 that are spaced apart from each other. The fork 97 is positioned such that its fingers 98 and 99 straddle the rounded tip portion 86 of the control lever 83. Thus, when the fork 97 is moved up and down in FIG. 4, it engages the rounded tip portion 86 of the control lever causing the control lever to move up and down and, consequently, the inner cylinder 78 to be rotated within the outer cylinder 77.

In use with an aircraft wing or rotor, the vectored jet control assembly 76 shown in FIG. 4 is mounted within the wing, rotor, or other control surface of the aircraft in such a way that the slot 81 is exposed at a critical location such as on the trailing edge of a wing or rotor. The balance of the mechanism might, including the control assembly is located within the wing or rotor itself. During flight, air pressure is provided to the plenum 79 from a source (not shown) of compressed air. This compressed air, in turn, escapes through the slots 81 and 82 and is ejected as a jet sheet 101 having a length corresponding to the length of the slots 81 and 82. When modification of aerodynamic properties are called for, an appropriate control voltage is applied to the bender 91 through electrodes 93 and 94 causing the inner cylinder 78 to rotate and misalign the slots 81 and 82, as best illustrated in FIG. 5.

With the slots misaligned as shown, the direction of the jet sheet 101 is changed. For example, as shown in FIG. 5, the slot 82 is moved upwardly with respect to the slot 81 to cause the direction of the jet sheet 101 to move downward. Similarly, if the slot 82 is misaligned in a downward direction as seen in FIG. 5, the direction of the jet sheet 101 is moved upwardly. The degree of deflection or vectoring of the jet sheet 101 is a function of the magnitude of misalignment between the slots 81 and 82. A slight misalignment, for example, causes a slight change in direction of the jet sheet while a larger misalignment results in a larger change in direction. If it is desired to discontinue the blowing altogether, the slots 81 and 82 can be completely misaligned with each other to shut off the flow of compressed air. Thus, the direction at which the jet sheet 101 is ejected from the slot 81 is selectively controllable by appropriate application of control voltages to the piezoelectric bender 91 as is the magnitude of the blowing.

As illustrated in FIG. 5, it has been found that the degree to which the jet sheet 101 can be deflected by misalignment of the slots can be enhanced substantially by providing the slot and the outer cylinder with smoothly contoured edges 101 and 103 that form Coanda surfaces. More specifically, as the slots 81 and 82 begin to misalign and the direction of the ejected jet sheet 101 moves downwardly in FIG. 5, the flow gradually begins to attach itself through the Coanda effect to the curved surface 103. This has the overall effect of enhancing the deflection of the flow by "pulling" it toward the Coanda surface and toward the curved outer surface of the outer cylinder 71. At some point determined by the geometry and pressure parameters, the flow detaches from the Coanda surface under the influence of centrifugal force. The ultimate result is that a substantially greater degree of deflection is achieved through a combination of slot misalignment and the Coanda surface than can be achieved through slot misalignment alone. Thus, the invention as embodied in FIGS. 4 and 5 has proven to be an effective and efficient means of producing a controlled and vectorable jet sheet of compressed air with minimum mechanical complexity, minimum power requirements, and predictable blowing and vectoring characteristics.

Figure 6:
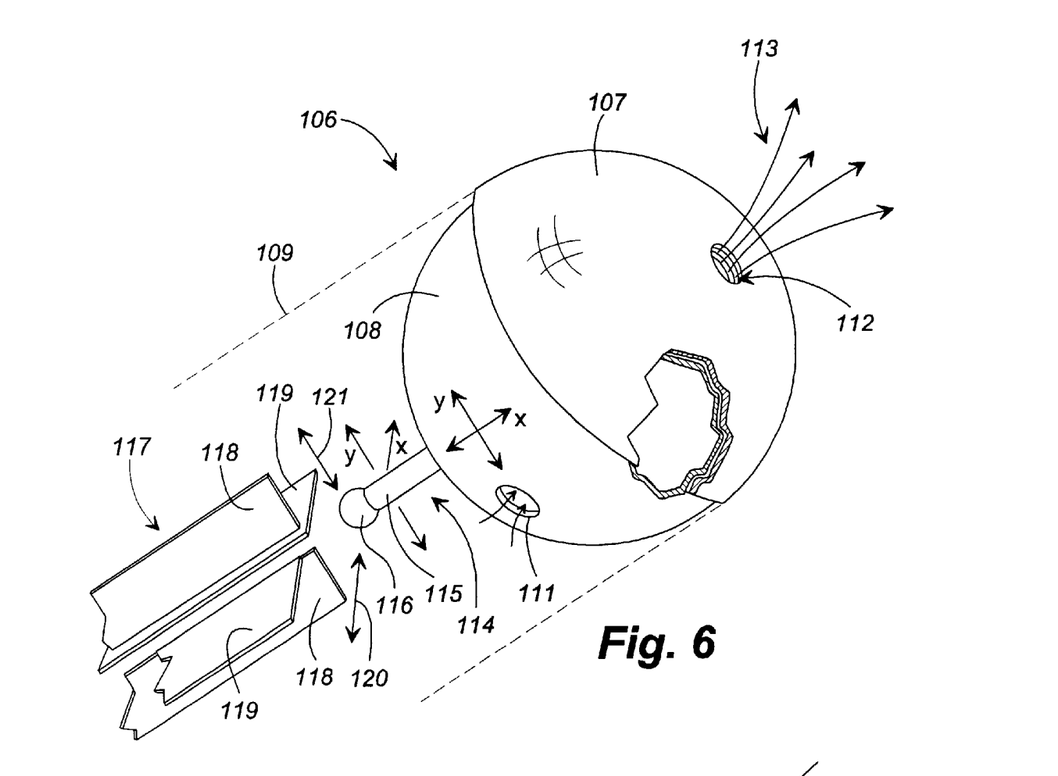
FIG. 6 is a perspective view illustrating yet another embodiment of the invention for producing a jet that is vectorable in two dimensions.

FIGS. 6 through 9 illustrate the present invention in yet another embodiment for producing a jet of compressed air that can be vectored or directed in two dimensions. This embodiment takes the form of a vectored jet nozzle 106 comprising a generally hemispherically shaped outer shell or baffle 107 having a spherical inner shell 108 nestled therein. The inner shell 108 might be formed as a hemisphere or a part of a sphere rather than a complete sphere if desired. The inner shell 108 has an outer diameter that is substantially the same as the inner diameter of the baffle 107. In this way, the inner shell 108 fits within the baffle 107 and can rotate therein in a manner similar to the operation of a ball and socket joint. A nozzle housing 109 is illustrated in phantom lines. In the embodiment of FIG. 6, the housing 109 sealingly couples to the baffle 107 and encloses the inner shell 108 and other mechanisms of the invention. It should be understood, however, that the particular configuration of the housing 109 is not a limitation of the invention. Many other configurations of the housing could be provided. For example, a number of vectored jet nozzles could be enclosed within a larger housing with their baffles 107 exposed on the surface of the housing to produce a number of vectored jets. Accordingly, the configuration of the housing 109 in FIG. 6 is presented for clarity of illustration and not a limitation of the invention.

An opening 111 is formed in the inner shell 108 within the housing 109 to permit pressurized air from within the housing to enter the inner shell 108. Inner shell 108 thus forms a plenum for storing and providing compressed air to be ejected from the nozzle. Nozzle openings, generally indicated at 112, are formed in the baffle 107 and in the inner shell 108. The openings are positioned and sized so that they can be mutually aligned or misaligned as the inner shell 108 moves or rotates within the baffle 107. When the openings 112 are aligned with each other, a jet 113 of compressed air is projected from the nozzle through the openings. The direction and characteristics of the jet 113 can be controlled by rotating the inner shell relative tot he outer shell as described in more detail below.

In order the control the motion of the inner shell 108 within the baffle 107 and thus control the alignment and misalignment of the openings 112, a smart material control system is provided. It should be understood that the control mechanism illustrated in the embodiment of FIG. 6 is provided for illustration only and that a wide variety of configurations for the smart material control system is possible. Accordingly, the control system configuration illustrated in FIG. 6 is provided for explanation only and should not be considered a limitation of the present invention.

The control system illustrated in FIG. 6 as an example, includes a lever 114 that projects from the inner shell 108 and terminates in a balled end 116. Thus, the lever 113 is similar to the lever 83 shown in the embodiment of FIG. 4. A set of piezoelectric benders 117 are anchored to a rigid structure (not shown) and extend to free ends located adjacent the balled end 116 of the lever 114. The benders 117 comprise a pair of X-axis benders 118 that, when actuated by a controlled voltage, move back and forth in the X-direction as indicated at 120, and a pair of Y-axis benders 119 that, when actuated, move in the Y-direction as indicated at 121. Since each pair of benders are spaced apart to define a central gap, each pair is free to move back and forth in its designated direction without interfering with the movement of the other benders.

Each pair of benders is operatively coupled to the lever 114 by an appropriate fork or other coupling mechanism (not shown) for transferring movement of the benders to the lever 114 and thus to the inner shell 108. The couplers are omitted for clarity in FIG. 6, but each of the couplers could, for example, be a fork similar to fork 97 in FIG. 4 such that movement of the benders 118 in direction 120 moves the lever in the X-direction and movement of the benders 119 in direction 121 moves the lever 114 in the Y-direction. In this way, the openings 112 can be aligned and misaligned in two dimensions by applying appropriate control signals to the benders 117. This process, in turn, vectors or directs the jet 113 in a desired direction as described in more detail below.

Figure 7:
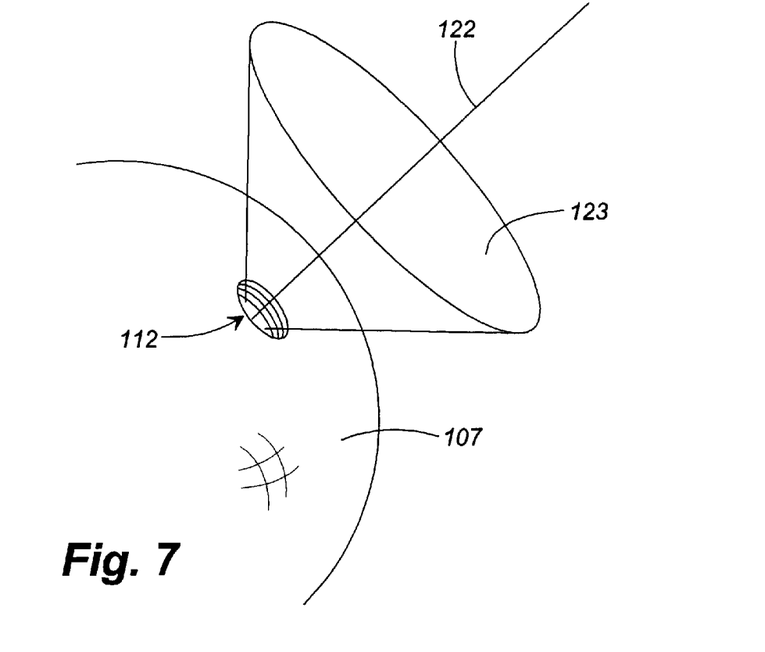
FIG. 7 is an enlarged partial perspective illustrating the two dimensional vectoring range achievable with the device of FIG. 6.

As the inner shell 108 rotates within the outer shell aligning and misaligning the openings, the jet 113 can be directed or vectored within certain limits. FIG. 7 illustrates generally that the jet can be directed in this manner in two dimensions and in any direction within a cone 123 that forms a predetermined angle with respect to an axis 122 of the openings 112.

Figure 8:
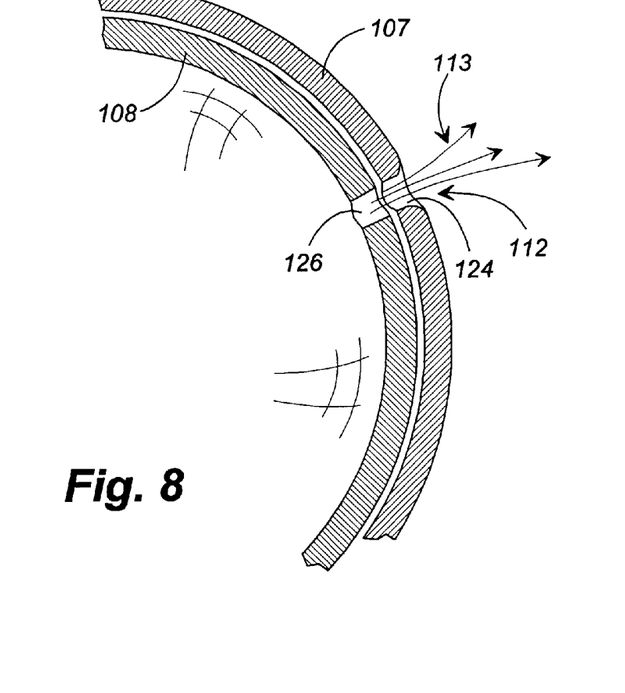
FIGS. 8 and 9 are cross-sectional views of the nozzle of FIGS. 6 and 7 illustrating alignment, misalignment of the blowing openings and the consequent vectoring of the blown jet.

FIG. 8 is a cross-sectional view showing the inner shell 108 nestled within the baffle 107 with the openings 112 aligned with each other. More specifically, the openings comprise an opening 124 in the baffle 107 of the nozzle and a corresponding opening 126 in the inner shell 108. In FIG. 8, the openings 124 and 126 are seen to be aligned with each other to produce a jet 113 of compressed air that is ejected substantially along the axis of the openings.

Figure 9:
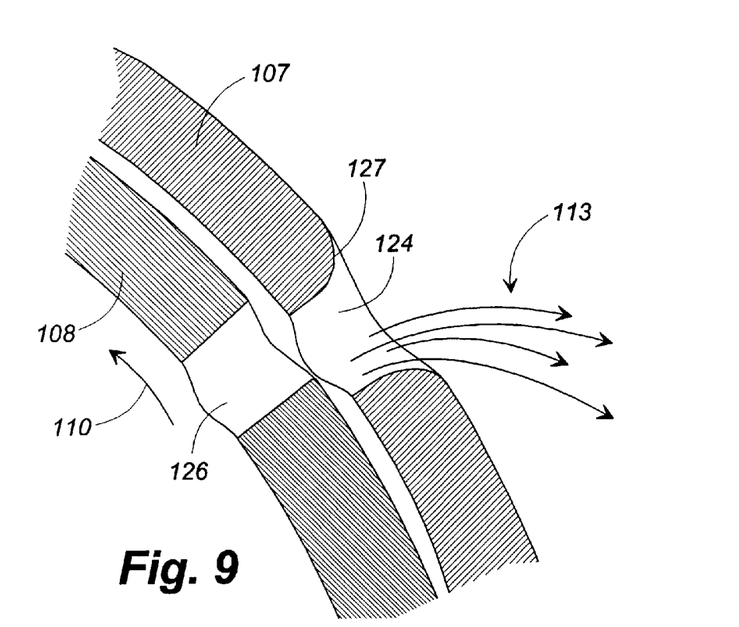

FIG. 9 illustrates the selected directing or vectoring of jet 113 by misaligning the openings 124 and 126. Here, the inner shell 108 is seen to be shifted in direction 110 with respect to the baffle 107. Such shifting causes the openings 124 and 126 to misalign as indicated. As a result, the jet of compressed air is ejected from the openings in a downward direction with respect to the central axis of the opening 124. To enhance the magnitude of the vectoring, the opening 124 preferably is formed with a smooth Coanda surface 127 that merges with the outer surface of the baffle 107. As with the embodiment of FIG. 4, as the vectored jet 113 exits the opening 124 at an angle relative to the axis of the opening, it tends to be attracted to and follow the Coanda surface 127 because of the Coanda effect. Thus, the combination of the misalignment of the openings 124 and 126 and the Coanda surface 127 substantially enhances the magnitude to which the jet 113 can be deflected from its central axis direction. Thus, combination of misalignment and Coanda surface provides a vectored jet nozzle wherein the issuing jet can be vectored through a relatively large angle with application of a small force provided through the smart material benders 117.

The one-dimensional vectored jet nozzle illustrated in FIGS. 4 and 5 and the two-dimensional vectored jet nozzle illustrated in FIGS. 6 through 9 have particular application in the aircraft industry as discussed above. In addition, the vectoring of jets of compressed fluid using highly accurate, low cost, and reliable smart material actuators has applications in many other industries as well. The vectoring of water jets from a submarine, for example, could be used for fine steering corrections or adjustments within the water. In addition, the present invention has application in spraying paint or other liquids and in the generation of a gas flame with improved burning efficiency and directional characteristics. Thus, the present invention should not be considered to be limited to use in aircraft blowing control system but has general applications wherever selective control of a blown jet of fluid is advantageous.

The invention has been described herein in terms of preferred embodiments and methodologies. It will be obvious to those of skill in the art that various additions, deletions, and modifications could be made by those of skill in the art within the scope of the invention. In particular, the illustrated mechanisms for coupling the smart material actuators to the nozzle portions of the devices could take on a variety of configurations other than the specific ones shown. For example, in FIG. 6, the actuators have been shown operating on a single lever attached to the inner sphere. An alternate embodiment might include a pair of actuators located 90° apart and operating on separate levers at the sides of the inner sphere. Alternatively, it can be the baffle that is moved, as it is the relative motion and misalignment of the openings that is important. A wide variety of similar configurations and placements of the control actuators are possible and all are considered to be within the scope of the present invention, which envisions use of smart material actuators in general for controlling a blown jet of compressed fluid.

It will be apparent to one of skill in the art that many variations and modifications may be made to the preferred embodiment as described above without substantially departing from the principles of the present invention. All such variations and modifications are intended to be included herein and within the scope of the present invention, as set forth in the following claims.

What is claimed is:

1. An apparatus for controlling the direction of a jet of compressed fluid comprising:

an outer shell formed with a first opening through which the jet of compressed fluid is ejected;

an inner shell disposed within said outer shell and having a second opening alignable with said first opening;

means for providing compressed fluid to said inner shell for ejection when said first and second openings are substantially aligned;

said inner and outer shells being movable with respect to each other for selectively aligning and misaligning said first and second openings to change the direction of the jet of compressed fluid ejected through said openings;

a smart material actuator adapted to deform in a predictable way upon application of an appropriate control stimulus; and a coupler for coupling deformations of said smart material coupler to said shells to cause said shells to move relative to each other to control the direction of the jet of compressed fluid.

2. An apparatus for controlling the direction of a jet of compressed fluid as claimed in claim 1 and wherein said inner and outer shells are substantially cylindrical and wherein said second shell is disposed within and rotatable with respect to said first shell.

3. An apparatus for controlling the direction of a jet of compressed fluid as claimed in claim 2 and wherein said first and second openings comprise elongated slots formed in said inner and outer shells for producing a compressed fluid jet sheet when said slots are aligned.

4. An apparatus for controlling the direction of a jet of compressed fluid as claimed in claim 3 and wherein said slots extend substantially longitudinally along their respective shells.

5. An apparatus for controlling the direction of a jet of compressed fluid as claimed in claim 4 and wherein said first slot is formed with a smoothly contoured Coanda surface for enhancing deflection of the jet of compressed fluid as said slots are progressively misaligned with each other.

6. An apparatus for controlling the direction of a jet of compressed fluid as claimed in claim 1 and wherein said inner and outer shells are substantially spherically shaped, and further comprising a first smart material actuator for moving said shells in a first direction with respect to each other and a second smart material actuator for moving said shells in a second direction with respect to each other, relative movement of said shells aligning and misaligning said openings for selectively directing the jet of compressed fluid in two dimensions.

7. An apparatus for controlling the direction of a jet of compressed fluid as claimed in claim 6 and wherein said first and second openings are substantially cylindrically shaped.

8. An apparatus for controlling the direction of a jet of compressed fluid as claimed in claim 7 and wherein said first opening is formed with a smoothly contoured Coanda surface for enhancing the deflection of the jet of compressed fluid as said openings are aligned and misaligned.

9. An apparatus for controlling the direction of a jet of compressed fluid as claimed in claim 8 and wherein said smart material actuator comprises at least one piezoelectric bender.

10. An apparatus for controlling the blowing of a compressed fluid, said apparatus comprising a plenum for containing a compressed fluid, a passageway communicating with said plenum and extending to a free end for directing compressed fluid from said plenum for ejection as a blown jet at said free end, a shutter movable in and out of said passageway to control the magnitude of the blown jet, and a smart material actuator coupled to said shutter for moving said shutter in and out of said passageway in response to control signals supplied to said smart material actuator.

11. An apparatus for controlling the blowing of a compressed fluid as claimed in claim 10 and further comprising a flexible membrane within said passageway covering and sealing off said shutter for providing a smoothly transitioning surface to reduce turbulence as said shutter moves into said passageway and means for delivering compressed fluid to the region beneath said membrane for counteracting the force of pressurized fluid moving through said passageway as said shutter moves into said passageway and pushes said membrane upwardly into the fluid flow.

12. The apparatus of claim 11 and wherein said passageway is formed by a pair of spaced walls and wherein said shutter moves through a slit in one of said walls, said means for delivering compressed fluid to the region beneath said membrane comprises an equalizing pressure chamber enclosing said slit and being in communication with the compressed fluid.

13. The apparatus of claim 12 and wherein said pressure chamber is mounted to said one of said walls enclosing said slit and said smart material actuator and further comprising an opening formed in said one of said walls communicating between said passageway and said chamber to provide pressurized fluid to said chamber.

14. An apparatus for producing and selectively vectoring a jet of compressed fluid, said apparatus comprising a cylindrical outer shell, a cylindrical inner shell disposed in said outer shell and being rotatable with respect thereto, said inner shell being in communication with a source of compressed fluid, a first opening formed in said outer shell, a second opening formed in said inner shell, said second opening being alignable with said first opening upon relative rotation of said shells to allow compressed fluid to escape through and be ejected from said aligned openings as a jet, and a smart material actuator configured and arranged to cause relative rotation of said inner and outer shells upon application of appropriate control signals to said smart material actuator, said relative rotation progressively aligning and misaligning said first and second openings to vary the direction at which the compressed fluid jet is ejected.

15. The apparatus of claim 14 and wherein said first opening is formed with a Coanda surface.

16. The apparatus of claim 15 and wherein said smart material actuator comprises a bender.

17. The apparatus of claim 16 and wherein said bender is a piezoelectric bender responsive to a control voltage.

* * * * *